United States Patent [19]
Cutler et al.

[11] 3,777,645
[45] Dec. 11, 1973

[54] PHOTOGRAPHIC APPARATUS

[75] Inventors: Norman W. Cutler, Braintree; John F. Pasieka, Acton; Myron A. Seider, Needham, all of Mass.

[73] Assignee: Polaroid Corporation, Cambridge, Mass.

[22] Filed: Dec. 12, 1972

[21] Appl. No.: 314,417

[52] U.S. Cl. .................................. 95/49, 95/44 R
[51] Int. Cl. ........................................ G03b 17/14
[58] Field of Search ............................. 95/44 R, 49

[56] References Cited
UNITED STATES PATENTS
| | | | |
|---|---|---|---|
| 1,900,730 | 3/1933 | Petit et al. | 95/49 |
| 1,948,141 | 2/1934 | Stokes | 95/49 |
| 2,930,304 | 3/1960 | DeZelar | 95/49 |

FOREIGN PATENTS OR APPLICATIONS
| | | | |
|---|---|---|---|
| 611,979 | 4/1935 | Germany | 95/49 |

*Primary Examiner*—Fred L. Braun
*Attorney*—Brown & Mikulka

[57] ABSTRACT

A photographic apparatus including a movable sliding carrier for selectively registering either a viewing screen or a film holder with the exposure aperture of a photographic camera. The viewing screen and film holder are so arranged within the carrier as to prevent any registration of the film holder with the exposure aperture while the viewing screen is in at least partial registration with the camera exposure aperture. Moreover, the photographic apparatus is so configured as to obviate the need for a movable dark slide proximate the film holder for preventing exposure of the film while the carrier is in a position in which the viewing screen is in registration with the camera exposure aperture.

20 Claims, 3 Drawing Figures

PHOTOGRAPHIC APPARATUS

Background of the Invention

Various forms of photographic apparatus are presently known in which a sensitized material holder such as a film pack adapter may be inserted between a camera back and a focusing panel holding a translucent focusing screen upon which the object to be photographed has been focused. The object is viewed and focused on the viewing screen directly through the camera's objective lens by opening the shutter, iris diaphragm, or whatever exposure control means are provided. The shutter is closed after focusing and the film holder is then inserted between the camera back and the focusing panel in position for exposure. In addition to being cumbersome, there is the possibility that either the shutter or film holder dark slide may be inadvertently left open when the film holder is inserted with the result that the film is accidentally exposed.

Camera constructions are also known wherein an object may be focused on a focusing screen or the like mounted on a carrier upon which is also mounted a film holder. The carrier may be moved to position either the focusing screen or the film holder in registration with the camera exposure aperture. While such arrangements allow convenient and exact focusing through the camera objective, and subsequent movement of the film holder into position for exposure by a simple manipulation of the carrier, they require a movable dark slide in covering relationship with the film holder and photosensitive material. Configured as such, it is possible that the dark slide may be inadvertently left open during movement of the film carrier from its focusing position to its exposure position. As a result, light may pass into the camera bellows through the focusing screen and "fog" that portion of the photosensitive material which is in partial registration with the camera exposure aperture when the focusing screen is in at least partial registration with the same.

Summary of the Invention

The present invention provides a photographic apparatus including a movable sliding carrier for selectively registering either a viewing screen or a film holder with the exposure aperture of a photographic camera. The viewing screen and film holder are so arranged within the carrier as to prevent any registration of the film holder with the exposure aperture while the viewing screen is in at least partial registration with the camera exposure aperture. As such, ambient light is not permitted to pass through the viewing screen into the camera bellows and cause premature exposure of the film. Moreover, the photographic apparatus is so configured as to obviate the need for a movable dark slide proximate the film holder for preventing exposure of the film while the carrier is in a position in which the viewing screen is in registration with the camera exposure aperture.

It is an object and feature of the present invention to provide a photographic apparatus including a sliding carrier back for a photographic camera for selectively registering both a viewing screen and a film holder with a camera exposure aperture.

Another object and feature of the present invention is to provide a sliding carrier back for use in conjunction with a photographic camera for selectively positioning both a viewing screen and a film holder into registration with the camera's exposure aperture, the viewing screen and the film holder being so spaced in said carrier such that neither the viewing screen nor the film holder can be in partial registration with the camera exposure aperture when the other is in at least partial registration with the camera exposure aperture.

Still another object and feature of the present invention is to provide a sliding carrier back for use in conjunction with a photographic camera for selectively positioning both a viewing screen and a film holder into registration with the camera's exposure aperture, the sliding carrier back being so configured as to protect the film from exposure when the viewing screen is in registration with the camera's exposure aperture, thereby obviating the need for a movable dark slide arrangement associated with the film holder.

Another object and feature of the present invention is to provide a photographic apparatus comprising: a camera back support having a first opening therein; a carrier having second and third openings therein, the carrier being slidably mounted on the camera back support for movement between a first position, in which the second opening is in registration with the first opening and a second position, in which the third opening is in registration with the first opening; means for mounting photosensitive material in covering relationship with the third opening; means for mounting a viewing screen in covering relationship with the second opening; means for preventing any registration of the third opening with the first opening when the second opening is in at least partial registration with the first opening; and means formed as part of the camera back support for preventing light from exposing the photosensitive material when the second opening is in registration with the first opening.

Other objects of the invention will, in part, be obvious and will, in part, become apparent as the following description proceeds. The features of novelty which characterize the invention will be pointed out with particularity in the claims annexed to and forming part of this Specification.

Brief Description of the Drawings

For a fuller understanding of the nature and objects of the invention, reference should be made to the following detailed description taken in conjunction with the accompaning drawings wherein.

Detailed Description of the Invention

Figure 1:
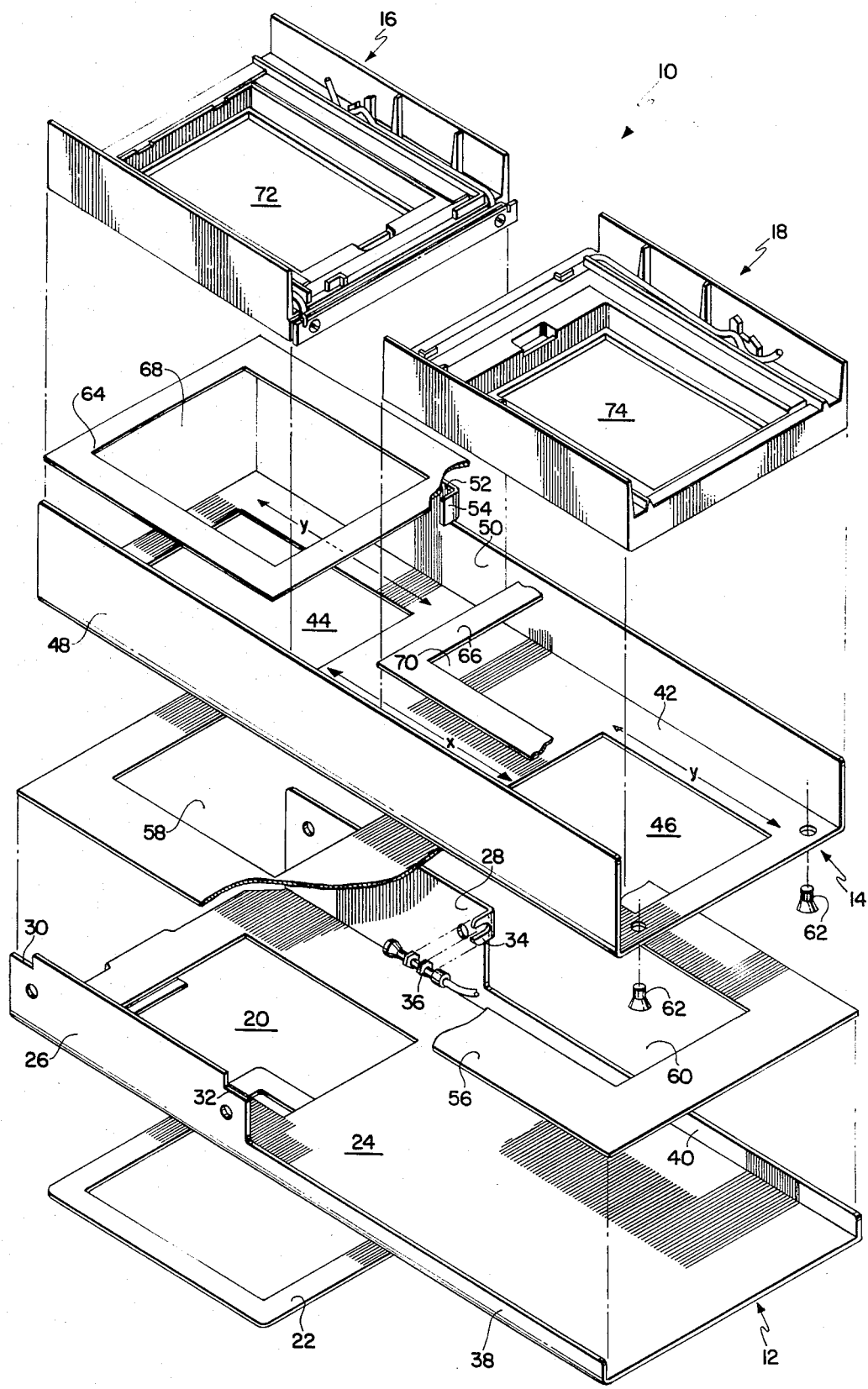
FIG. 1 is an exploded perspective of a portion of a sliding carrier back assembly according to the present invention.
Figure 2:
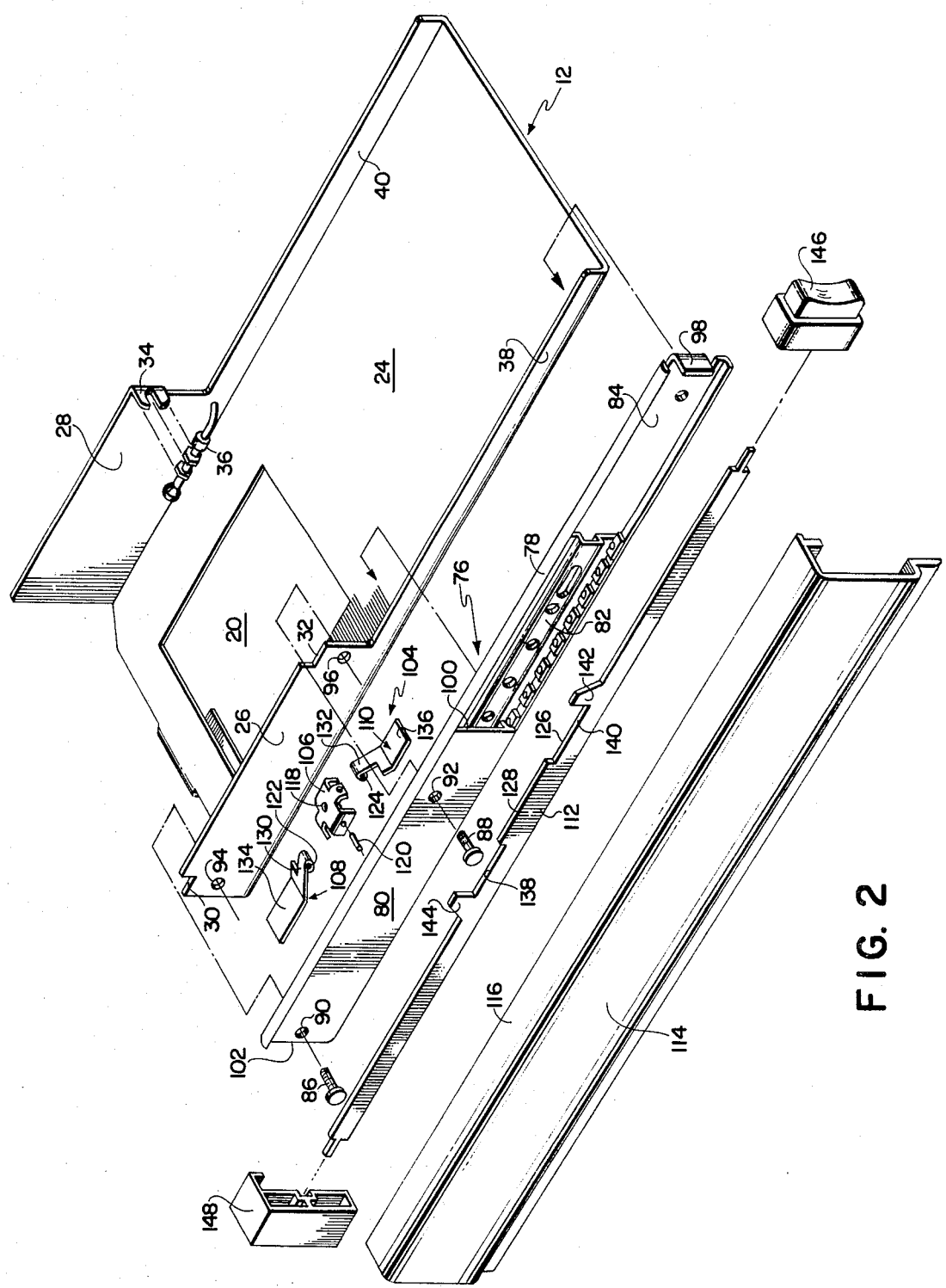
FIG. 2 is an exploded perspective of still another portion of the sliding carrier back assembly according to the present invention.

Looking to FIGS. 1 and 2, there is shown a preferred embodiment of the sliding carrier back according to the present invention wherein a sliding carrier back assembly is shown generally at 10. Assembly 10 includes a carrier support member 12, a sliding carrier 14 and two mounting adapter assemblies 16 and 18. Assembly 16 is configured to retain a viewing screen (not shown), while assembly 18 is a film holder retainer.

The sliding carrier back assembly 10 is attached to the rear of a camera (not shown) by any one of a variety of mechanisms known in the art. In the preferred embodiment of the present invention, this camera is of the industrial multi-purpose variety. For a fuller understanding of a camera of this type, reference should be made to U.S. Pat. No. 3,143,941 by P. B. Mason, et al. When properly mounted, back assembly 10 is positioned with a first aperture 20, formed in support member 12, in registration with the rear opening of the camera (not shown). A light sealing gasket 22 is positioned between support member 12 and the rear of the camera for providing a lighttight seal between the two. Carrier support member 12 includes a flat planar portion 24 in which aperture 20 is formed and a pair of side walls 26 and 28. Side wall 26 contains two steps or notches 30 and 32 located in its uppermost portion, the purpose of which will become more apparent below. Side wall 28 is formed with an extension 34 which is cooperative with a preview cable, a portion of which is shown at 36. As disclosed in a copending application for U.S. Pat. entitled "Photographic Apparatus," Ser. No. 292,487, by Myron A. Seiden, filed Sept. 27, 1972, and assigned in common herewith, preview cable 36 forms one component of a preview focusing system for a photographic camera of a variety herein mentioned. For a fuller understanding of the operation and components of one such preview focusing system, reference should be made to the above-mentiontioned application Ser. No. 292,487. Side walls 26 and 28 are stepped down proximate the center portion of support member 12 to definite lower side walls 38 and 40, respectively.

Sliding carrier 14 includes a flat elongated bottom portion 42 in which are located a second aperture 44 and a third aperture 46. Apertures 44 and 46 are positioned close to the left and right ends of carrier 14, respectively, and are separated a distance "X" from each other. Carrier 14 also includes two side walls 48 and 50 of equal height except for a raised portion 52 located on the left side of wall 50. Portion 52 includes an extension 54 which, in conjunction with preview cable 36, actuates the preview focus system of the camera. Attached to the bottom of carrier 14 is a light sealing gasket 56 in which are formed two apertures 58 and 60 under apertures 44 and 46, respectively, of carrier 14.

Mounted in covering relationship with apertures 44 and 46 are mounting adapter assemblies 16 and 18. Assemblies 16 and 18 are mounted to carrier 14 by a plurality of screws, a typical pair of which are shown at 62. In order to provide a light seal between carrier 14 and assemblies 16 and 18, two gaskets 64 and 66 are positioned below assemblies 16 and 18, respectively. Gaskets 64 and 66 include apertures 68 and 70 therein, of a size commensurate with apertures 44 and 46. Detailed descriptions of mounting adapter assemblies 16 and 18 may be found in U. S. Pat. No. 3,143,941. Assembly 16 is employed for retaining a focusing and composition screen of known varieties while assembly 18 retains a film pack (not shown) including a plurality of photosensitive material units. While the preferred embodiment shown is best adapted for pack film, it should be noted that roll film or single sheet film units may be employed. Assembly 16 is formed having an aperture 72 for permitting focusing and composition of an image when aperture 72 is in registration with aperture 20. Similarly, assembly 18 includes an aperture 74 for permitting the image to be photographed to pass through assembly 18 and expose the lowest film unit in the film pack.

Sliding carrier 14 is slidable movable within member 12 for alternately placing either apertures 72 and 44 or apertures 74 and 46 in registration with aperture 20 of member 12. The specific mechanisms employed for accomplishing this are best shown in FIG. 2. A slide assembly is shown generally at 76. Assembly 76 includes a sliding drawer unit 78 commonly known in the art. Drawer unit 78 contains a mounting plate 80, a movable slide track 82 and a movable slide 84. Sliding drawer unit 78 is fixedly mounted to the inside of wall portions 26 and 38 of back 10 by two bolts 86 and 88 passing through bores 90 and 92, formed in mounting plate 80, and two bores 94 and 96 formed in wall 26 of member 12. Movable slide 84 is in turn fixedly mounted to the outside of slide carrier 14 through wall portion 48 by any suitable means. Consequently, carrier 14 is slidable within support member 12 for moving either aperture 44 or aperture 46 into registration with aperture 20 of support member 12. Tabs, such as that shown at 98 are provided at either end of movable slide 84 for limiting the longitudinal movement of carrier 14 within support member 12. Specifically, tab 98, located on the right end of slide 84, contacts a vertical edge 100 of mounting plate 80 when the carrier 14 has been fully moved to its leftmost position, i.e., a position in which aperture 46 is in registration with aperture 20. Similarly, a tab (not shown) on the left end of slide 84 will contact a vertical edge 102 of plate 80 thereby limiting the rightward movement of carrier 14, i.e., a position in which aperture 44 is in registration with aperture 20. Although not shown, a slide assembly similar to assembly 76 is provided on the opposite side of carrier support member 12.

Figure 3:
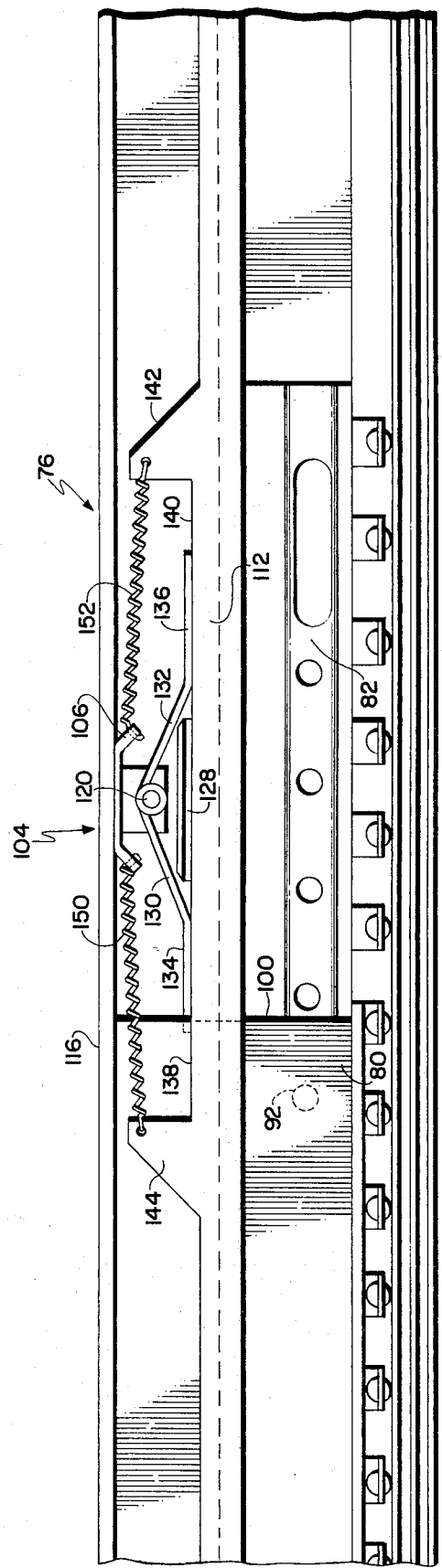
FIG. 3 is a lateral view of a portion of the sliding carrier back assembly according to the present invention.

In order to provide the camera operator with an indicator of proper aperture registration, a "click and lock" assembly shown generally at 104 is provided. Assembly 104 includes a mounting plate 106, a pair of movable actuators 108 and 110, an actuation bar 112 and a housing 114. Mounting plate 106 is fixedly attached to the bottom of a top wall section 116 through a bolt or screw (not shown) extending through a mounting hole 118 formed in mounting plate 106. Movable actuators 108 and 110 are pivotally mounted in mounting plate 106 through a pin 120 extending therethrough Pin 120 pivotally captures actuators 108 and 110 through holes 122 and 124 formed in actuators 108 and 110, respectively. When properly hinged, actuators 108 and 110 are movable independent of each other and are biased downwardly, e.g., by a torsion spring (not shown) contained within the confines of mounting plate 106. Actuators 108 and 110 contact the top portion 126 of actuator bar 112 and are selectively movable when actuator bar 112 is moved. Actuators 108 and 110 are formed having ramped portions 130 and 132 in addition to flat portions 134 and 136, respectively. Due to the specific configuration of actuator members 108 and 110, ramped portions 130 and 132 are biased toward a plateau portion 128 formed in the center of top portion 126 of bar 112. Similarly, flat portions 134 and 136 are biased into contact with lower portions 138 and 140 formed to each side of plateau portion 128 along top portion 126 of bar 112. This status is best shown in FIG. 3. Additionally provided on bar 112 are two extensions 142 and 144, the purposes of which will become more apparent below.

As mentioned previously, slide assembly 76 is provided with a "click and lock" mechanism for insuring the correct location of sliding carrier 14 within carrier support 12. Specifically, when carrier 14 is in its viewing position with aperture 44 in registration with aperture 20, mechanism 104 is operative to prevent any further movement of carrier 14. Movable acutator 108 is in a position wherein its flat portion 134 is captured within notch 32, thereby preventing any further leftward movement. In order to move exposure aperture 46 into registration with aperture 20, it is necessary to unlock mechanism 104 to allow slide assembly 76 and carrier 14 to be moved to the left. Unlocking of mechanism 104 is achieved by pressing a button 146 provided on the right side of bar 112. When button 146 is pushed to the left, it forces actuator 112 to the left and moves plateau portion 128 under movable actuator 108. Movement of bar 112 to the left forces movable actuator 108 in a clockwise manner about pin 120 against the bias of its associated torsion spring. Clockwise movement of actuator 108 is continued until plateau portion 128 is under flat portion 134. When in this position, flat portion 134 is above notch 32 and is no longer captured therein. Once actuator 108 has been released from notch 32, further movement of button 136 forces the whole slide assembly 76 to move to the left carrying carrier 14 with it. Actuator 108 rides along the top of wall 26 past notch 30. During this movement, actuator 110 rides over notch 32 and along the top portion of wall 26 until such time as it falls off wall 26 and into notch 30. Further leftward movement of slide assembly 76 is prohibited due to tab 98 contacting vertical wall portion 100 of mounting plate 80. Due to the spring biasing of movable actuator 110, there is an audible "click" as actuator 110 falls off the top portion of wall 26 into notch 30. The operator now knows that carriage 14 has been fully moved and is now in its exposure position wherein aperture 46 is in registration with aperture 20. Carrier 14 is now locked into its exposure position. Further leftward movement of carrier 14 is prohibited due to the engagement of tab 98 with vertical wall 100 and further rightward movement is prohibited due to the engagement of actuator 110 within notch 30. It should also be noticed that two extension springs (150 and 152) are connected between mounting plate 106 and both extension 142 and 144 for recentering bar 112 under mounting plate 106 when button 146 is released.

In order to return carrier 14 to its viewing position, a similar release operation is performed. Specifically, a button 148 is provided on the left hand side of bar 112 for releasing lock mechanism 104 and moving slide assembly 76 and carrier 14 to the right. Movement of button 148 to the right moves plateau portion 128 under actuator 110 whereby the latter is moved in a counterclockwise direction about pin 120 until flat portion 136 escapes its engagement with notch 30. Continued movement of button 148 moves slide assembly 76 and carrier 14 to the right. Actuator 108 rides up over notch 30 and along the top portion of wall 26 until it is again captured in notch 32. When flat portion 134 of actuator 108 falls into notch 32, it is operative to sound an audible "click" which informs the operator that full rightward movement has been performed. A tab (not shown) located on the leftward of slide 84 contacts vertical wall portion 102 of mounting plate 80 and limits further rightward movement of slide assembly 76.

When button 148 is released, the extension spring 152 between mounting plate 106 and extension 142 operates to recenter bar 112 directly under mounting plate 106.

Sliding carrier back 10 is additionally provided with means for preventing accidental exposure of film mounted within adapter assembly 18. Specifically, when carrier 14 is in its viewing position, apertures 74 and 46 lie directly above flat planar portion 24 of carrier support member 12. Due to the light sealing gaskets 56 and 66 positioned between carrier support member 12, carrier 14 and mounting adapter assembly 18, a lighttight seal is provided between the film unit contained within assembly 18 and flat planar portion 24. Accordingly, flat planar portion 24 serves as a stationary dark slide for preventing ambient light from exposing the film unit positioned above aperture 74. Flat planar portion 24 serves as a dark slide until carrier 14 is moved to a position in which apertures 46 and 74 are moved into partial registration with aperture 20. Accordingly, the need for a movable dark slide below aperture 74 is obviated.

Sliding carrier back 10 is additionally configured so as to prevent pre-exposure of a film unit during the movement of carrier 14 from its viewing to its exposure position. In particular, viewing aperture 44 and exposure aperture 46 of carrier 14 are separated by a distance X which is equal to or greater than the dimension Y of either apertures 44, 46, or 20, assuming all are of equal size. This specific separation between the two apertures serves to isolate aperture 46 from aperture 20 when aperture 44 is in at least partial registration with aperture 20. Should the separation X be less than the distance Y, it is possible that ambient light may enter the viewing screen and pass through apertures 72, 44 and 20 and into the bellows of the camera. It is possible for this to occur when apertures 72 and 44 are in at least partial registration with aperture 20. Should the separtion distance X be less than the longitudinal dimension Y, apertures 46 and 74 will be in partial registration with aperture 20 while partial registration is made between apertures 72 and 44 with aperture 20. As a result, the light passing through the viewing screen and into the bellows will exit through aperture 20 and pass through apertures 46 and 74 and cause a pre-exposure of the film unit. By separating apertures 44 and 46 by the distance X greater than or equal to the distance Y, it is possible to avoid simultaneous registration of the viewing screen and the film unit with aperture 20. Specifically, the distance X acts as a moving dark slide allowing apertures 72 and 44 to pass out of registration with aperture 20 before aperture 46 and aperture 74 are placed in at least partial registration with aperture 20. It should become apparent that carrier 14, as configured, prevents simultaneous partial registration of both the viewing and exposure apertures with aperture 20. Accordingly, the need for a movable dark slide for protecting the film unit of aperture 74 is obviated. As such, the present sliding carrier back 10 may be constructed of simple design with few moving parts and therefore, relatively low manufacturing cost.

The present invention may be readily distinguished from sliding back assemblies previously disclosed. One example of such an assembly is provided in a patent to E. B. Baker, U. S. Pat. No. 520,290. Baker discloses a sliding back assembly requiring a sliding dark slide "G" in covering relationship with the film unit. Additionally, Baker fails to disclose that the separation between the focusing aperture and the exposure aperture is equal to or greater than the width of either aperture.

Therefore because certain changes may be made in the above-described apparatus without departing from the true spirit and scope of the invention herein involved, it is intended that the subject matter of the above depiction shall be interpreted as illustrative and not in a limiting sense.

What is claimed is:

1. Photographic apparatus comprising, in combination:
   camera back support means having a first opening therein;
   a carrier having second and third openings therein, said carrier being mounted in said support means for movement between a first position, wherein said second opening is in registration with said first opening, and a second position, wherein said third opening is in registration with said first opening;
   means for mounting photosensitive material in covering relationship with said third opening;
   means for mounting viewing screen means in covering relationship with said second opening;
   means for preventing any registration of said third opening with said first opening when said second opening is in at least partial registration with said first opening; and
   means, formed as part of said camera back support means, for preventing light from exposing said photosensitive material when said second opening is in registration with said first opening.

2. The photographic apparatus of claim 1 in which said means for preventing light from exposing said photosensitive material when said second opening is in registration with said first opening is an extension of said camera back support means, said extension being in light sealing relationship with said photosensitive material and said third opening when said carrier is in its said first position.

3. The photographic apparatus of claim 2 in which said third opening is in overlying relationship with said extension when said second opening is in at least partial registration with said first opening.

4. The photographic apparatus of claim 3 in which said means for preventing light from exposing said photosensitive material further includes light sealing gasket means positioned between said carrier and said camera back support means.

5. The photographic apparatus of claim 1 in which said carrier is so configured as to prevent any registration of said third opening with said first opening when said second opening is in at least partial registration with said first opening.

6. The photographic apparatus of claim 5 in which said second and third openings of said carrier are spaced from each other a distance sufficient for preventing any registration of said third opening with said first opening when said second opening is in at least partial registration with said first opening.

7. The photographic apparatus of claim 6 in which said carrier is configured with said second and third openings being spaced from each other a distance equal to or greater than the longitudinal length of said first opening measured in a direction parallel to said movement of said carrier between said first and second positions.

8. The photographic apparatus of claim 7 in which said second opening and said third opening are separated by a portion of said carrier means having a length equal to or greater than said longitudinal length of said first opening, said portion of said carrier means providing an integrally formed dark slide for preventing any registration of said third opening and said photosensitive material with said first opening before said second opening and said viewing screen means are moved out of any registration with said first opening.

9. The photographic apparatus of claim 1 in which a slide assembly is provided between said camera back support means and said carrier for slidably moving said carrier in said camera back support means between said first position and said second position.

10. The photographic apparatus of claim 9 in which said slide assembly includes means for limiting movement of said carrier past said second position when said carrier is moved from said first position to said second position and for limiting movement of said carrier past said first position when said carrier is moved from said second position to said first position.

11. The photographic apparatus of claim 9 in which said slide assembly is further provided with means for locking said carrier at said first position or said second position, and means for releasing said locking means for permitting movement of said carrier away from said first position toward said second position and from said second position toward said first position.

12. The photographic apparatus of claim 11 in which said slide assembly includes audible sounding means actuable to produce an audible sound when said carrier is fully moved to either said first or said second position.

13. The photographic apparatus of claim 12 in which said audible sounding means is operable to produce an audible sound when said carrier is locked in its said first position or when said carrier is locked in its said second position.

14. The photographic apparatus of claim 11 in which said means for releasing said locking means includes means for moving said carrier means toward its said first position when said carrier means is released from its said second position and for moving said carrier means toward its said second position when said carrier means is released from its said first position.

15. Photographic apparatus comprising, in combination:
   camera back support means having a first opening therein;
   a carrier having second and third openings therein, said carrier being mounted in said support means for movement between a first position, wherein said second opening is in registration with said first opening, and a second position, wherein said third opening is in registration with said first opening;
   means for mounting photosensitive material in covering relationship with said third opening;
   means for mounting viewing screen means in covering relationship with said second opening; and
   slide assembly means, provided between said camera back support means and said carrier for slidably moving said carrier within said camera back support means between said first and second positions, said slide assembly means providing relative sliding movement between itself and said camera back support means and between itself and said carrier.

16. The photographic apparatus of claim 15 in which said slide assembly is configured having means for limiting movement of said carrier past said second position when said carrier is moved from said first position to said second position and for limiting movement of said carrier past said first position when said carrier is moved from said second position to said first position.

17. The photographic apparatus of claim 15 in which said slide assembly is further provided with means for locking said carrier at said first position and said second position, and means for releasing said locking means for permitting movement of said carrier away from said first position toward said second position and from said second position toward said first position.

18. The photographic apparatus of claim 17 in which said slide assembly is configured having audible sounding means actuable to produce an audible sound when said carrier is fully moved to said first position and when said carrier is fully moved to said second position.

19. The photographic apparatus of claim 18 in which said audible sounding means is operable to produce an audible sound when said carrier is locked in its said first position and when said carrier is locked in its said second position.

20. The photographic apparatus of claim 17 in which said means for releasing said locking means is configured having means for moving said carrier means toward its said first position when said carrier means is released from its said second position and for moving said carrier means toward its said second position when said carrier means is released from its said first position.

* * * * *